April 14, 1953 — W. J. STEVENS — 2,634,991

SPLINELESS COUPLING MACHINE ELEMENT

Filed Nov. 13, 1948

*INVENTOR.*
WILLIAM J. STEVENS
BY
Woodcock and Phelan
ATTORNEYS

Patented Apr. 14, 1953

2,634,991

UNITED STATES PATENT OFFICE 2,634,991

SPLINELESS COUPLING MACHINE ELEMENT

William J. Stevens, Philadelphia, Pa.

Application November 13, 1948, Serial No. 59,892

3 Claims. (Cl. 287—53)

This invention relates to shafts and other machine elements such as pulleys, gears, wheels and the like which may be coupled or mated thereto for transmission of power by angular motion.

Heretofore it has been the common practice to use splines, keys or equivalent to retain the mated parts in fixed angular relation to each other, and consequently costly machining operations have been required. Moreover, with splines or keys the perimeters of the shaft and of the bore of its mate change abruptly in outline with the result torsional stresses are concentrated or localized at regions where there are discontinuities. At these same regions, there is a marked tendency to fracture during heat-treating operations, such as hardening. The spline or key construction has a further disadvantage when, as in selective gear transmission, there is relative sliding movement of the mated parts because in such cases the sharp edges of the splines or keys scrape lubricant from the coacting surfaces.

In accordance with the invention, the perimeters of the shaft and of the bore of its mating pulley, gear or the like are smoothly continuous, with the result that operating stresses are distributed and tendency to crack during heat-treatment is eliminated. The avoidance of sharp edges or corners on the mating surfaces also insures freedom from oil-scraping action when the parts are moved relative to each other along the axis of their rotation.

In preferred embodiments of the invention, the perimeter of the shaft as well as that of the mating bore, is defined by three flat sides tangent to a base circle whose center is on the axis of rotation and by three arcuate sides each tangent to two of the flat sides and each of whose center of curvature lies on a second circle concentric with the base circle. More specifically and for optimum characteristics, the ratio of the radius of the base circle to the radius of the second circle should be small and lie within rather restricted limits.

The invention further resides in shafts, pulleys, wheels, gears and the like having features of construction hereinafter described and claimed.

Figure 1:
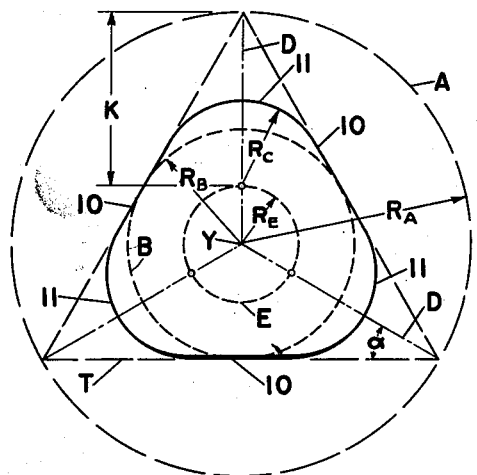
Figure 2:
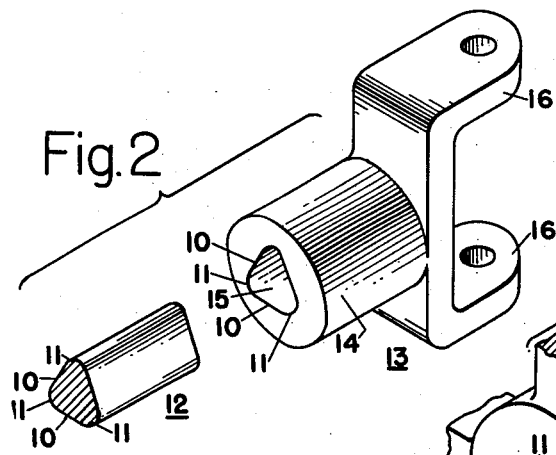
Figure 3:
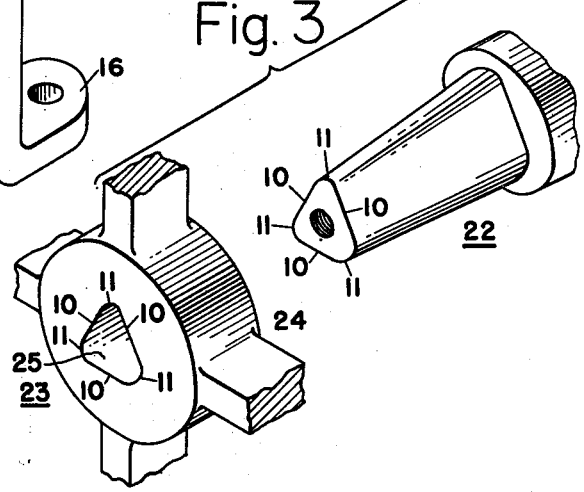
Figure 4:
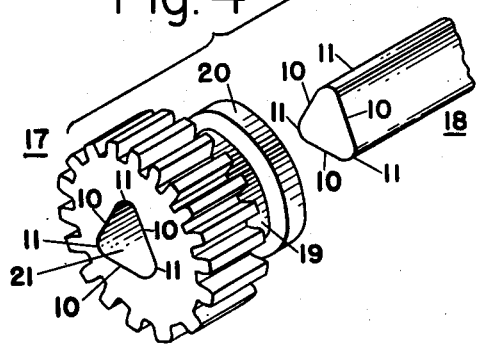

For a more complete understanding of the invention, reference is made to the accompanying drawings in which:

Fig. 1 is an explanatory figure referred to in discussion of fundamentals of the invention;

Fig. 2 in perspective shows mated parts of elements of a universal joint;

Fig. 3 in perspective shows the invention as applied to a wheel or pulley and its shaft; and Fig. 4 in perspective shows a mated shaft and gear of a gear-shift mechanism.

Referring to Fig. 1, the outline or perimeter of the shaft and of the bore of its mating part is developed by laying out an equilateral triangle whose sides T are tangent to a base circle B whose center is on the axis of rotation. A circumscribing circle A having its center at the center Y of the base circle B is drawn about the triangle. The points of intersection of a third circle E, concentric with circles A and B, with the medians D of the triangle define the centers of curvature of the arcuate sides 11 of the shaft or bore. These arcs are each tangent to two adjacent sides T of the triangle. That portion of each side of the triangle T which joins two adjacent arcs forms a flat side 10 of the perimeter of the shaft or bore.

The three fundamental dimensions which define the smoothly continuous solid outline shown in Fig. 1 are the radius of the circumscribing circle A, the radius of the base circle B and the radius of the arcuate sides 11. The relation between the radius $R_A$ of the circumscribing circle A and the radius $R_E$ of the circle of centers is defined by (1) $$R_E = \frac{R_A}{X}$$

For optimum characteristics, the selected ratio of these radii or the value of X is about 4, although advantages of the invention may be obtained to greater or lesser extent where X is within the limits of about 8 to 4/3.

The relation between the radius $R_B$ of the base circle B and the radius $R_A$ of the circumscribing circle A may be expressed as follows:

(2) $$R_B = R_A \sin \alpha$$

where $\alpha$=one-half of the apex angle between the projected extensions of the flat sides 10.

The relation between the radius $R_C$ of each of the arcuate sides 11 and the radii of the circumscribing and base circles may be expressed as follows:

(3) $$R_C = K \sin \alpha$$

where $$K = R_A - R_E$$

The three general equations above are definitive of the essential relations between the radii of the base circle, the circumscribing circle, the circle of centers, and of the arcuate sides.

When, as in Fig. 1, the perimeter of a shaft or of the bore of its mating part has three flat sides, the angle $\alpha$ is 30° and Equation 2 (supra) may therefore be rewritten as follows:

(2A) $$R_B = \frac{R_A}{2}$$

(for $\alpha = 30°$ — sin $\alpha = \frac{1}{2}$)

Consequently Equation 1 may be rewritten as (1A) $$R_E = \frac{2R_B}{X}$$

and Equation 3 may be rewritten as (3A) $$R_C = \frac{1}{2}\left(2R_B - \frac{2R_B}{X}\right) = \frac{R_B}{X}(X-1)$$

As appears from Equations 1A to 3A (and assuming that X is about 4, the above stated optimum value), the radius $R_B$ of the base circle is about one-half that of the circumscribing circle A; the radius $R_E$ of the circle of centers is about one-half that of the base circle B; and the radius $R_C$ of the arcuate sides is about three-quarters that of the base circle B.

For the above stated limits of X:

for $X = 8$ $R_E = \frac{R_B}{4}$ and $R_C = \frac{7}{8} R_B$ for $X = \frac{4}{3}$ $R_E = \frac{3}{2} R_B$ and $R_C = \frac{R_B}{4}$ As evident from Fig. 1, the perimeter of a shaft, or the perimeter of the bore of its mating part, when so constructed is smoothly continuous and devoid of abrupt changes in outline at which there would be high concentration of stresses. In manufacture of a shaft, for example, the blank may be forged to approximate shape and may then be ground directly to size; alternatively, the blank can be ground approximately to size before heat-treatment and subsequently ground to exact dimensions. The grinder may be controlled by a master template in substantially the same manner that cam shafts are ground in accordance with known practice. In contrast, the production of the ordinary splined shaft involves the steps of turning the diameter, milling the splines, cylindrical grinding of the faces of the splines and subsequent grinding of the bases and sides of the splines. The forging of the shaft results in improvement of its internal grain structure and the elimination of splines or key-ways avoids the tendency to crack or shear during heat-treatment or during transmission of power.

These same advantages obtain to even greater extent in the manufacture and use of the mating member used with the shaft. The bore may be broached to approximate size and subsequently ground accurately to size by using an internal grinder having a master template as in the present practice of grinding cam-shaft cams.

The invention is applicable to all power-transmitting arrangements in which a mating part is attached to a shaft or is slidable along it and may therefore be used in or for gear boxes, universal joints, clutches, selective gear transmissions, front and rear driving axles, machine tool drives, propeller drives and the like.

For example, as shown in Fig. 2, the shaft 12 having a perimeter or cross-sectional outline as discussed in connection with Fig. 1, may be coupled to or mated with a universal joint element 13, the bore 15 of whose hub 14 is of similar smoothly continuous outline having flat sides 10 connected by arcs 11 tangent thereto. As will be understood by those skilled in the art, the ears or lugs 16 of element 13 are for pivotal connection to a gimbal block similarly connected to another forked element of the universal joint.

When the mating part need not be slidable along the shaft, the latter, as shown in Fig. 3, may be tapered. Specifically, each of the flat sides 10 of the shaft 22 progressively increases in width from the receiving end of the shaft and the radius of curvature of each of the arcuate sides correspondingly increases so that the shape of the shaft at each section normal to the axis of rotation fulfills the fundamental relations discussed in connection with Fig. 1. The hub 24 of the wheel, gear or pulley 23 to be mated with shaft 22 has a bore 25 which is complementarily tapered, the perimeter or outline of the bore in each plane normal to the axis of rotation fulfilling the fundamental relationships discussed in connection with Fig. 1.

When the mating part is necessarily slidable along the shaft, as in selective gear transmissions, the cross-sectional area is constant as shown in Fig. 4. The gear 17 slidable along shaft 18 may be provided with a hub 19 having a flange 20 so to form a recess for engaging the forked end of a shift lever not shown. The outline of the bore 21 of the gear 17 like the outline of its coacting shaft 18 satisfies the relations discussed in connection with Fig. 1 to avoid the concentrations of stress and the expensive machining operations inherent with the spline and key arrangements previously used. In sliding gear arrangements or the like, the smoothly continuous surfaces of a shaft and mating part, constructed in accordance with the invention, have the further advantage that during their relative sliding movement the surfaces remain lubricated in contrast with the oil-scraping action characteristic of sliding gear arrangements using splines or keys.

It is also possible to dispense with splines or keys by recourse to shaft outlines which are, for example, square, pentagonal or hexagonal and the flat sides of which are smoothly joined by arcuate sides tangent thereto. With such constructions, the same fundamental dimensions are involved, namely, the radii $R_A$, $R_B$, $R_C$ and $R_E$. In all cases, $\alpha$ may be defined by (4) $$\alpha = 90° - \frac{360}{2N}$$

where $N$ = number of flat sides. However, the generally triangular configuration shown in the drawings is definitely to be preferred because of its superior torque transmission characteristics and because it is more easily machined.

What is claimed is:

1. A coupling member for transmitting rotation to a mated coupling member having flat sides tangent to a base circle B whose center is on the axis of rotation and having intervening arcuate sides each tangent to two of said flat sides and extending to a greater distance from said axis than said flat sides, the projected extensions of said flat sides intersecting on a circumscribing circle A having radius $R_A$ whose ratio to the radius $R_B$ of base circle B is inversely equal to the sine of $\alpha$, where $\alpha$ is one-half the apex angle between each pair of said flat sides, the center of curvature of each of said arcuate sides being on a circle E concentric with said circles A and B and having a radius $R_E$ whose ratio to the radius $R_A$ is the reciprocal of X (where X is about 4 within the limits of 8 to $\frac{4}{3}$), and the radius $R_C$ of each of said arcuate sides being equal to $(R_A - R_E) \sin \alpha$.

2. A coupling member for transmitting rotation to a mated coupling member having a smoothly continuous perimeter defined by N flat sides (where N is an integer greater than 2 and less than 7) tangent to a base circle B whose center is on the axis of rotation and by a like number of arcuate sides each tangent to two of said flat sides, the projected extensions of said flat sides intersecting on a circumscribing circle A and forming apex angles 2 $\alpha$ each of value equal to $$2\left(90°-\frac{360°}{2N}\right)$$

the ratio of the radius $R_A$ of the circle A to the radius $R_B$ of base circle B being inversely equal to sin $\alpha$, the center of curvature of each of said arcuate sides being on a circle E concentric with said circle A and having a radius $R_E$ whose ratio to the radius $R_A$ is the reciprocal of X (where X is about 4 within the limits of 8 to 4/3), and the radius $R_C$ of each of said arcuate sides being equal to $(R_A - R_E) \sin \alpha$.

3. A coupling member for transmitting rotation to a mated coupling member having a smoothly continuous perimeter defined by three flat sides tangent to a base circle of radius $R_B$ whose center is on the axis of rotation and by three arcuate sides each tangent to two of said flat sides, the centers of curvature of said arcuate sides being on a circle concentric with said base circle and whose radius is equal to $$\frac{2R_B}{X}$$

and the radius of curvature of each of said arcuate sides being equal to $$\frac{R_B}{X}(X-1)$$

where X is about 4 within the limits of 8 to 4/3.

WILLIAM J. STEVENS.

References Cited in the file of this patent

UNITED STATES PATENTS

| Number | Name | Date |
|---|---|---|
| 601,710 | Fay | Apr. 5, 1898 |
| 605,472 | Brown | June 14, 1898 |
| 1,422,067 | Abegg | July 11, 1922 |